US012313228B1

(12) United States Patent
Bertken

(10) Patent No.: US 12,313,228 B1
(45) **Date of Patent: *May 27, 2025**

(54) FLASHLIGHT WITH RECHARGEABLE BATTERY ASSEMBLY

(71) Applicant: Infinity X1 LLC, Las Vegas, NV (US)

(72) Inventor: Dennis Bertken, Las Vegas, NV (US)

(73) Assignee: INFINITY X1 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/009,815

(22) Filed: Jan. 3, 2025

Related U.S. Application Data

(63) Continuation of application No. 18/917,346, filed on Oct. 16, 2024, now Pat. No. 12,196,381, which is a continuation of application No. 18/811,546, filed on Aug. 21, 2024, now Pat. No. 12,158,249, which is a continuation of application No. 18/591,790, filed on Feb. 29, 2024, now Pat. No. 12,085,241.

(60) Provisional application No. 63/555,816, filed on Feb. 20, 2024.

(51) Int. Cl.
*F21L 4/08* (2006.01)
*F21V 23/04* (2006.01)

(52) U.S. Cl.
CPC .......... *F21L 4/085* (2013.01); *F21V 23/0414* (2013.01)

(58) Field of Classification Search
CPC ........................................................ F21L 4/085
See application file for complete search history.

(56) References Cited

U.S. PATENT DOCUMENTS 1,307,868 A 6/1919 Lyhne
5,868,790 A 2/1999 Vincent
(Continued)

FOREIGN PATENT DOCUMENTS

CN 202132720 U 2/2012
CN 211649883 U 10/2020

OTHER PUBLICATIONS

Streamlight 66608 MicroStream—https://www.amazon.com/Streamlight-66608-Flashlight-Micro-Stream/dp/B07DLZXZV1?th=1.

*Primary Examiner* — Alexander K Garlen
(74) *Attorney, Agent, or Firm* — Jeffer Mangels; Butler & Mitchell LLP; Brennan C. Swain, Esq.

(57) ABSTRACT

A flashlight assembly that includes a tubular main body portion, a tail portion that is removable from the tubular main body portion, a battery assembly, and an alignment system. The main body portion and tail portion cooperate to define a battery assembly interior. The tail portion includes a first charging opening that communicates the battery assembly interior with the exterior of the tail portion. The battery assembly is positioned in the battery assembly interior and includes a battery housing defining a battery housing interior, a rechargeable battery cell disposed in the battery housing interior, and at least a first charging receptacle associated with the battery housing. The alignment system includes one of a first protrusion or a first recess associated with the battery housing and the other of the first protrusion or the first recess associated with the battery assembly interior. The first protrusion is received in the first recess and the first charging receptacle is aligned with the first charging opening.

19 Claims, 9 Drawing Sheets

(56) References Cited

U.S. PATENT DOCUMENTS

| | | | | |
|---|---|---|---|---|
| 6,186,634 | B1 * | 2/2001 | Pitts | F21V 13/14 362/208 |
| 7,562,997 | B2 | 7/2009 | Liu | |
| 7,654,683 | B2 | 2/2010 | Ellis | |
| 7,806,555 | B2 | 10/2010 | Liu | |
| 7,926,971 | B2 | 4/2011 | West | |
| 8,425,078 | B2 | 4/2013 | Matthews | |
| 9,341,325 | B2 | 5/2016 | Sharrah | |
| 9,568,171 | B1 | 2/2017 | Grider | |
| 9,626,011 | B2 | 4/2017 | Chang | |
| 10,200,785 | B2 | 2/2019 | Kurek | |
| 10,529,973 | B2 | 1/2020 | Yau | |
| 10,578,297 | B1 | 3/2020 | Zhu | |
| 10,670,253 | B1 | 6/2020 | Lemon | |
| 10,711,953 | B1 | 7/2020 | Zhu | |
| 11,639,789 | B2 | 5/2023 | Sharrah | |
| 2005/0225969 | A1 | 10/2005 | Chen | |
| 2010/0254122 | A1 | 10/2010 | Bijan | |
| 2011/0068741 | A1 | 3/2011 | Liu | |
| 2011/0216529 | A1 | 9/2011 | Weng | |
| 2012/0033416 | A1 | 2/2012 | Ballard | |
| 2012/0224358 | A1 | 9/2012 | Noble | |
| 2013/0343042 | A1 | 12/2013 | Windom | |
| 2014/0036485 | A1 | 2/2014 | Parsons | |
| 2014/0268713 | A1 | 9/2014 | Unger | |
| 2015/0003050 | A1 | 1/2015 | Parsons | |
| 2018/0231214 | A1 | 8/2018 | Bian | |
| 2018/0231215 | A1 | 8/2018 | Bian | |
| 2019/0154215 | A1 | 5/2019 | Li | |
| 2021/0262622 | A1 | 8/2021 | Weizel | |
| 2022/0082239 | A1 | 3/2022 | Love | |
| 2022/0221143 | A1 | 7/2022 | Sharrah | |
| 2022/0252231 | A1 | 8/2022 | Wang | |

* cited by examiner

FLASHLIGHT WITH RECHARGEABLE BATTERY ASSEMBLY

CROSS-REFERENCE TO RELATED APPLICATIONS

This application is a continuation of U.S. patent application Ser. No. 18/917,346, filed Oct. 16, 2024, which is a continuation of U.S. patent application Ser. No. 18/811,546, filed Aug. 21, 2024, now U.S. Pat. No. 12,158,249, which is a continuation of U.S. patent application Ser. No. 18/591,790, filed Feb. 29, 2024, now U.S. Pat. No. 12,085,241, which claims the benefit of U.S. Provisional Application No. 63/555,816, filed on Feb. 20, 2024, the entireties of which are incorporated by reference herein.

FIELD OF THE INVENTION

The present invention relates to a flashlight, and more particularly to a flashlight with a rechargeable power source and movable port cover.

BACKGROUND OF THE INVENTION

Many modern flashlights include rechargeable batteries that may or may not be removable. The rechargeable battery and/or the housing related thereto may be removable.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a preferred embodiment of the present invention there is provided a flashlight assembly that includes a tubular main body portion that includes a light source associated therewith, a tail portion that is removable from the tubular main body portion, a switch that is configured to selectively provide power to the light source, a battery assembly positioned in a battery assembly interior, and an alignment system that includes one of a first protrusion or a first recess associated with the battery housing and the other of the first protrusion or the first recess associated with the battery assembly interior. The tubular main body portion and tail portion cooperate to define the battery assembly interior. The tail portion includes a first charging opening defined therein that communicates the battery assembly interior with an exterior of the tail portion. The battery assembly includes a battery housing defining a battery housing interior, a rechargeable battery disposed in the battery housing interior, and at least a first charging receptacle associated with the battery housing. The battery assembly is in electrical communication with the light source. The first protrusion is received in the first recess and the first charging receptacle is aligned with the first charging opening, such that a charging jack can be inserted through the first charging opening and into the first charging receptacle. The first charging opening has generally the same shape as the first charging receptacle, so that the charging jack can fit through the first charging opening and into the first charging receptacle.

In a preferred embodiment, the tail portion includes a receptacle cover that is movable between a first position wherein the receptacle cover covers the first charging opening and a second position where the receptacle cover does not cover the first charging opening. The tubular main body portion defines a flashlight axis, and the cover is movable between the first and second positions along the flashlight axis. The tail portion includes an inner diameter that at least partially defines the battery assembly interior. An alignment flange having first and second ends may extend around at least a portion of the inner diameter and the first recess may be defined between the first and second ends of the alignment flange.

The tail portion may include a second charging opening defined therein that communicates the battery assembly interior with the exterior of the tail portion and the battery assembly may include a second charging receptacle associated with the battery housing. When the first protrusion is received in the first recess the second charging receptacle is aligned with the second charging opening, such that a charging or power jack can be inserted through the second charging opening and into the second charging receptacle. The battery housing includes a stop member extending outwardly therefrom, wherein the stop member abuts the alignment flange. The stop member may extend at least partially circumferentially around the battery housing.

In accordance with another preferred embodiment of the present invention there is provided a method of powering a flashlight assembly that includes a plurality of steps. The steps may include obtaining a flashlight assembly that includes a tubular main body portion that defines a main body portion battery assembly interior, and a tail portion that defines a tail battery assembly interior. The flashlight assembly includes an alignment system that includes one of a first protrusion or a first recess associated with the battery housing and the other of the first protrusion or the first recess associated with the tail battery assembly interior. The steps may also include inserting a portion of the battery assembly into the main body portion battery assembly interior, aligning the first protrusion with the first recess, placing the tail portion on the battery assembly such that the first protrusion is received in the first recess, and rotating the tail portion and the battery assembly to threadingly engage a first set of threads on the tail portion with a second set of threads on the tubular main body portion, whereby the electrically communicated with a light source in the tubular main body portion.

The battery assembly may include a first charging receptacle and the tail portion may include a first charging opening defined therein. After the tail portion and the battery assembly are rotated to threadingly engage the first set of threads on the tail portion with the second set of threads on the tubular main body portion, the first charging receptacle is aligned with the first charging opening. A spring may be housed or located in the tail battery assembly interior (e.g., extending into the battery assembly interior from the tail wall of the tail portion). When the tail portion and battery assembly are rotated to engage the first and second sets of threads along a path to align the first charging opening and first charging receptacle, and the spring is compressed.

The tail portion may include a receptacle cover, and the method may include the step of moving the receptacle cover from a first position where the receptacle cover covers the first charging opening to a second position where the receptacle cover does not cover the first charging opening.

DETAILED DESCRIPTION OF THE PREFERRED EMBODIMENTS

Figure 1:
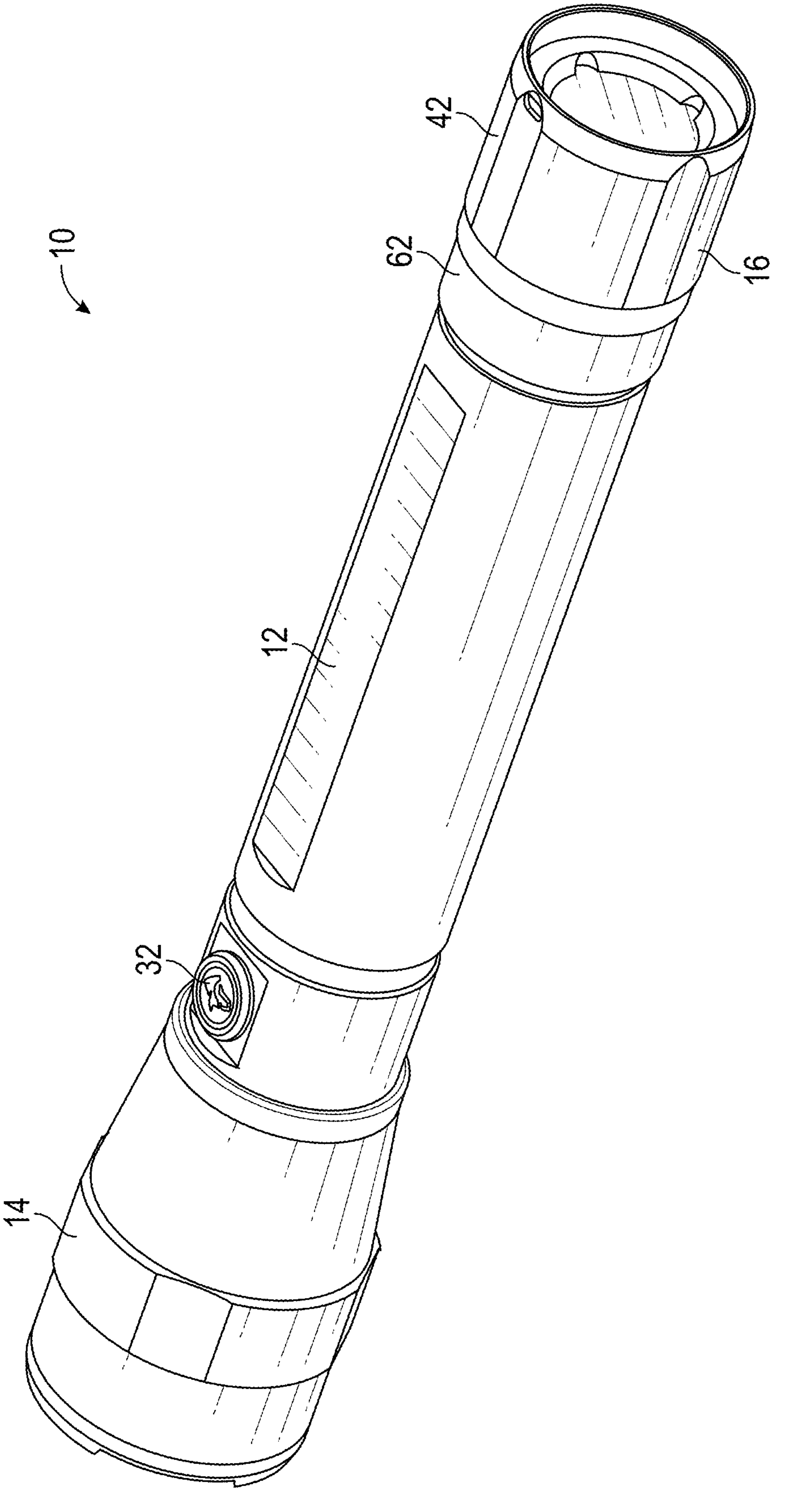
FIG. 1 is a perspective view of a flashlight assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 6:
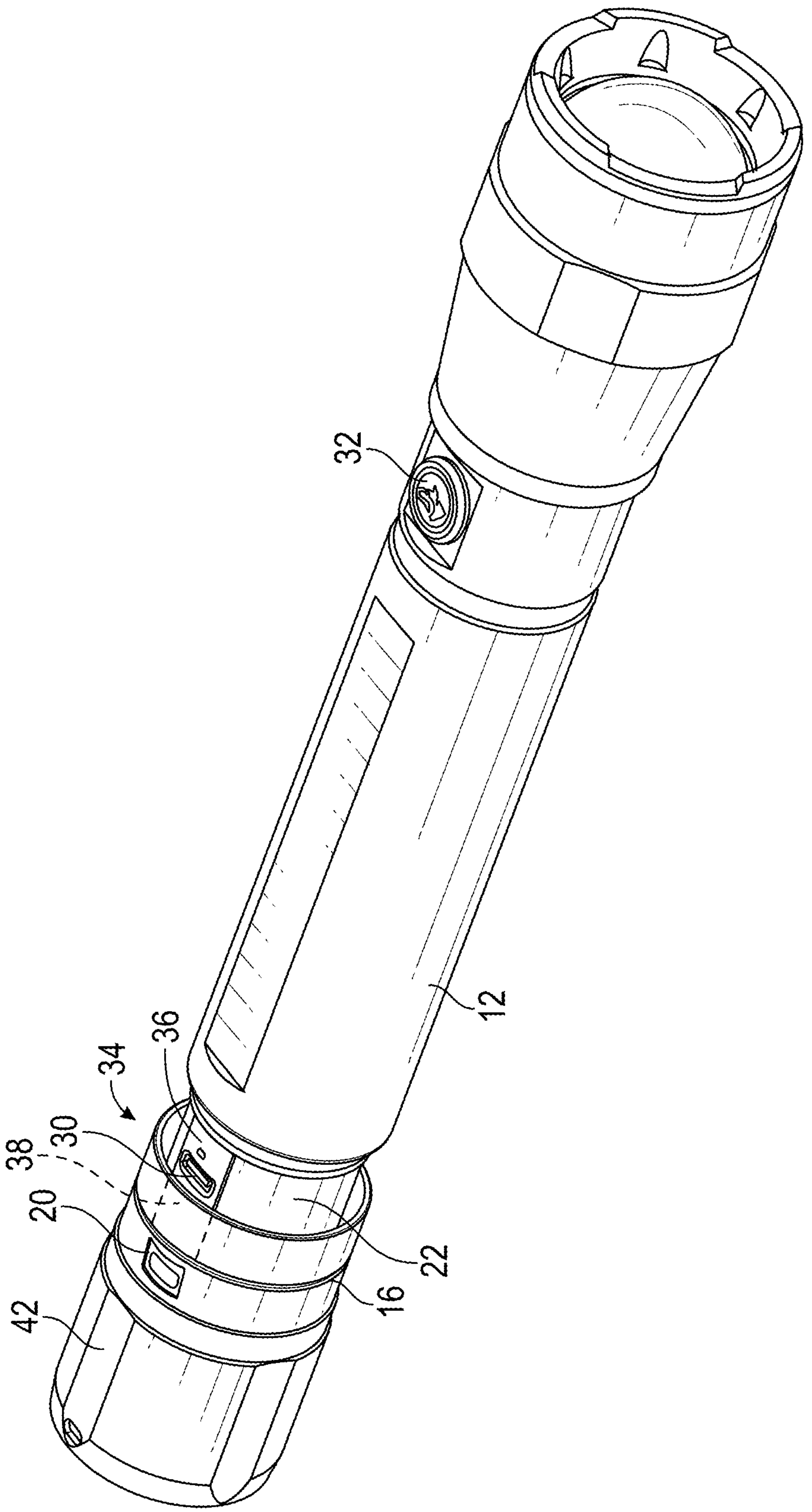
FIG. 6 is a perspective view of the flashlight assembly with the tail portion partially received on the battery assembly.
Figure 7A:
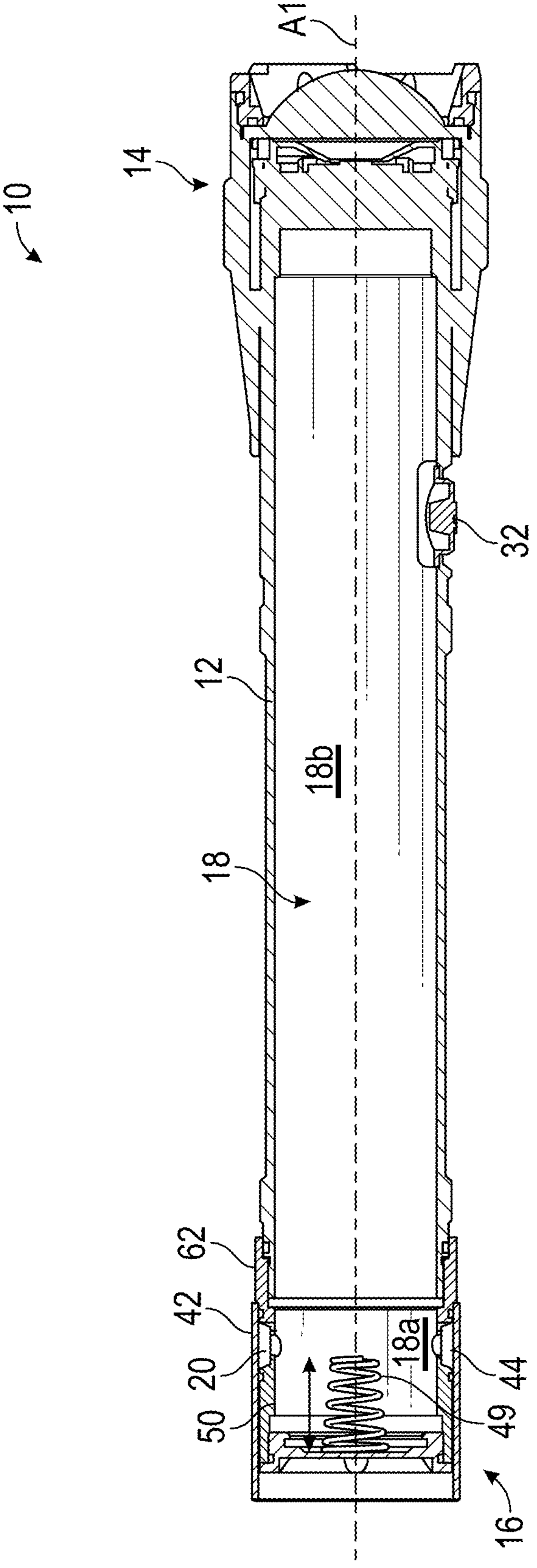
FIG. 7A is a side elevational cross-section of the flashlight assembly with the receptacle cover in the first or closed position.
Figure 7B:
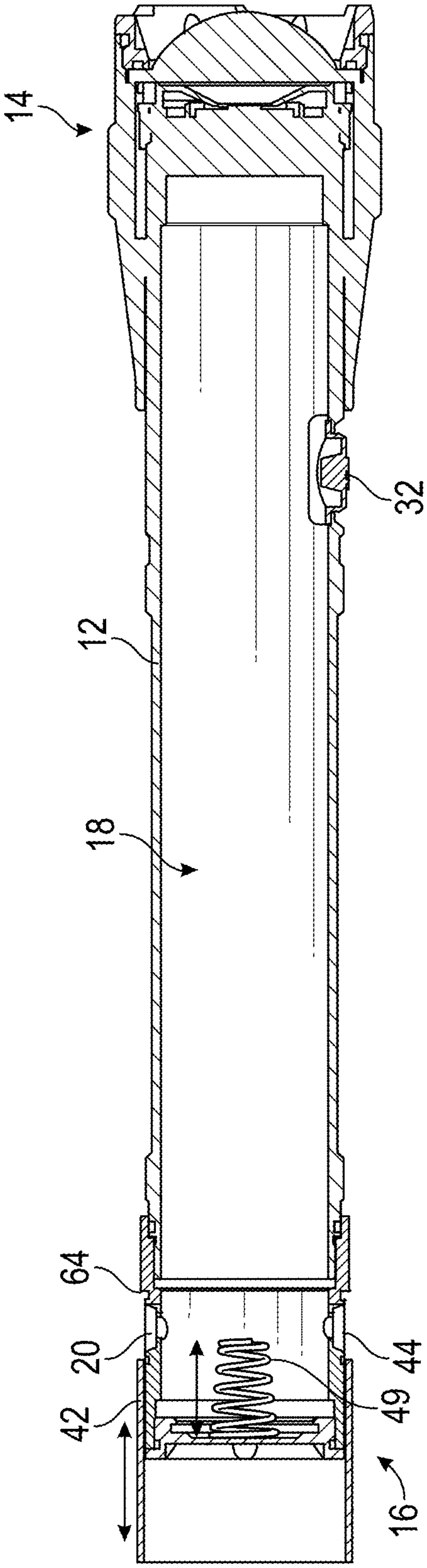
FIG. 7B is a side elevational cross-section of the flashlight assembly with the receptacle cover in the second or open position.
Figure 8:
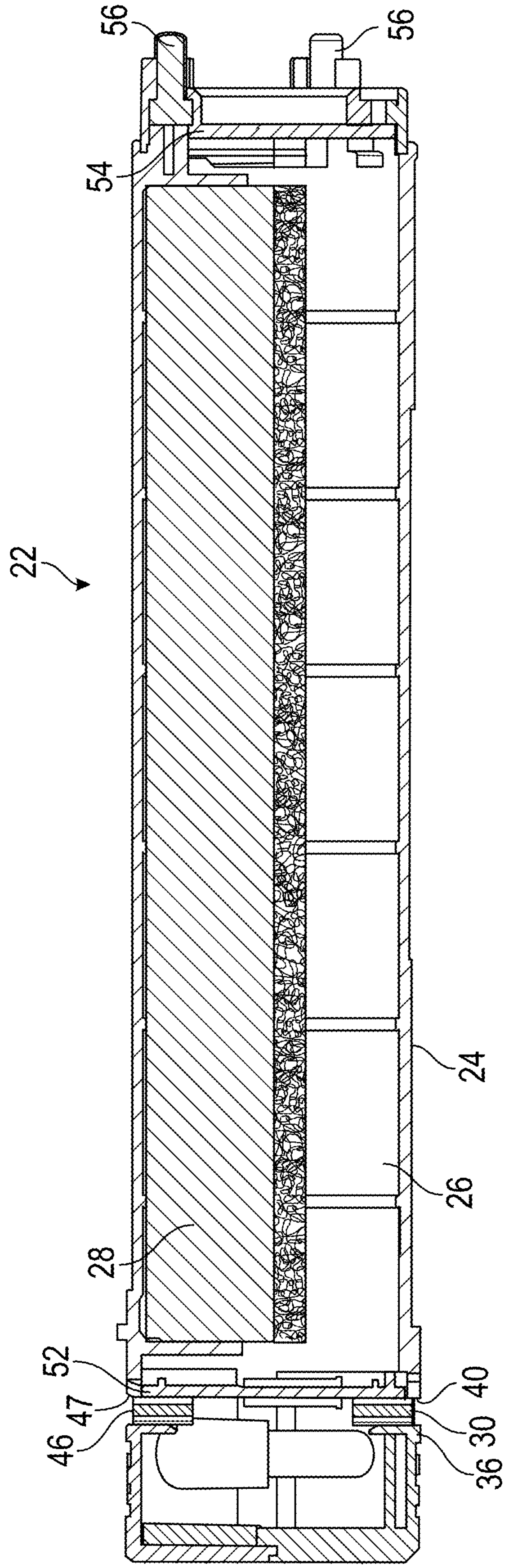
FIG. 8 is a side elevational cross-section of the battery assembly.

FIGS. 1-8 show a flashlight assembly 10 that includes a tubular main body portion 12 having a light source 14 associated therewith, and a tail portion 16 that is removable from the tubular main body portion 12. The tubular main body portion 12 and tail portion 16 cooperate to define a battery assembly interior 18. The battery assembly interior 18 is shown in FIG. 7A as broken into the tail battery assembly interior 18*a* and the main body portion battery assembly interior 18*b*. The tail portion 16 includes a first charging opening 20 defined therein that communicates the battery assembly interior 18 with an exterior of the tail portion 16. As shown in FIG. 8, the flashlight assembly 10 includes a battery assembly 22 positioned in the battery assembly interior 18 that includes a battery housing 24 defining a battery housing interior 26, a rechargeable battery cell 28 disposed in the battery housing interior 26, and at least a first charging receptacle 30 associated with the battery housing 24. The battery assembly 22 is in electrical communication with the light source 14.

Figure 5:
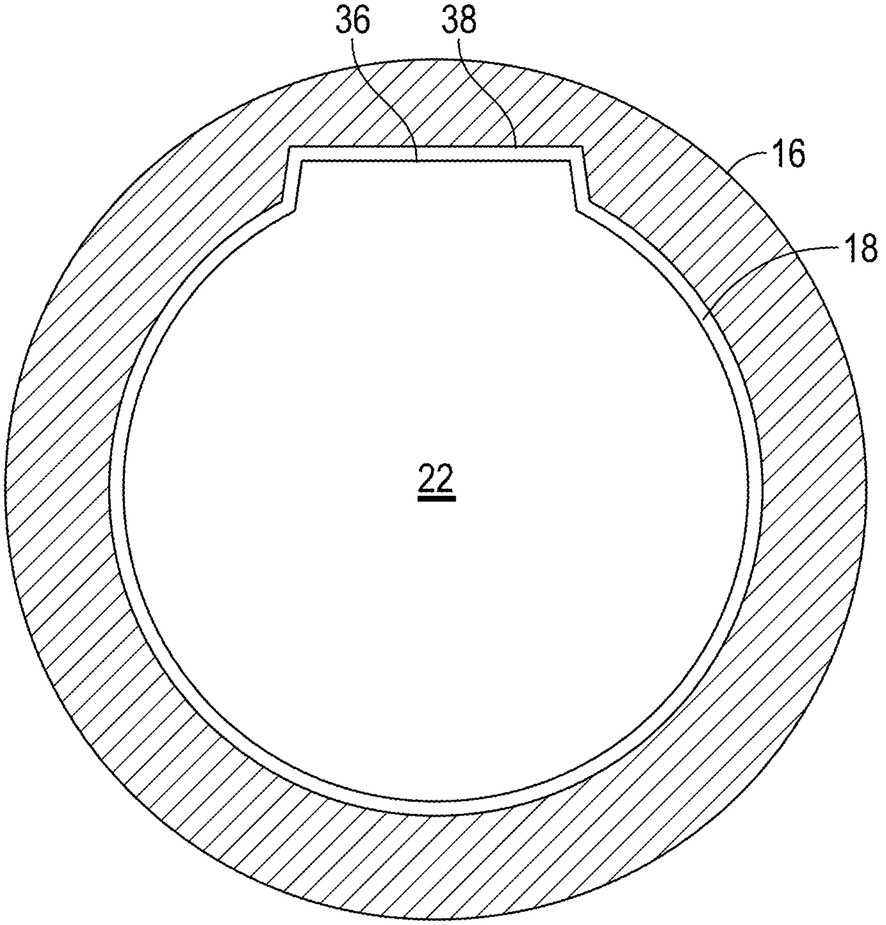
FIG. 5 is a schematic end view of the battery assembly inserted into the tail portion and the first protrusion received in the first recess.

As shown in FIGS. 1-4, the flashlight assembly 10 includes a switch 32 that is configured to selectively provide power to the light source 14, and an alignment system 34 that includes at least one of a first protrusion 36 or a first recess 38 associated with the battery housing 24 and the other of the first protrusion 36 or the first recess 38 associated with the battery housing interior 26 and/or the tubular main body portion 12 or the tail portion 16. As is best shown in FIG. 5, the first protrusion 36 is received in the first recess 38. When the first protrusion 36 is received in the first recess 38, the first charging receptacle 30 is aligned with the first charging opening 20, such that a charging jack can be inserted through the first charging opening 20 and into the first charging receptacle 30. FIG. 6 shows the battery assembly 22 inserted into the tubular main body portion 12. As is shown, a portion of the battery assembly 22 extends out of the tubular main body portion 12 after full insertion (i.e., after the electrical contacts 56 make contact with the contacts electrically connecting the light source and other electronics). With the alignment system 34, FIG. 6 shows the tail portion 16 partially slid onto the battery assembly 22, with the first protrusion 36 aligned with the first recess 38. Hidden lines are included in FIG. 6 to show the location of first recess 38. From the arrangement in FIG. 6, the tail portion 16 is moved further onto the battery assembly 22 with the first recess 38 aligned with the first protrusion 36 and once the first set of threads 60*a* and second set of threads 60*b* make contact, the tail portion 16 is threaded onto the tubular main body portion 12. It will be appreciated that as the tail portion 16 is rotated to engage the first set of threads 60*a* with the second set of threads 60*b*, because the first protrusion 36 is housed or located in the first recess 38, the battery assembly 22 rotates with the tail portion 16. As the tail portion 16 and battery assembly 22 are rotated and the first and second sets of threads are engaged, the tail portion travels or moves toward the tubular main body portion until the first and second sets of threads are fully engaged, at which point the first charging receptacle 30 is aligned with the first charging opening 20 (and the second charging receptacle 46 is aligned with the second charging opening 44, if present). In a preferred embodiment, the tail portion must be fully threaded onto the tubular main body portion for the first charging receptacle 30 to be aligned with the first charging opening 20. This may be due to the presence of a spring 49 in the tail battery assembly interior 18*a*, as shown in FIGS. 7A and 7B. As the tail portion is threaded onto the tubular main body portion, the battery assembly compresses the spring 49 (see the double ended arrow over the spring in FIG. 7B). In other words, the tail portion 16 travels a thread path from a starting position where the first charging receptacle 30 is not aligned with the first charging opening 20, and a finish position where the first charging receptacle is aligned with the first charging opening. The threads and spring are designed and dimensioned so that as the first charging receptacle and first charging opening are aligned when the tail portion has been fully threaded onto the tubular main body portion, and the spring is compressed.

The battery housing 24 may include a first housing charging opening 40 defined therein through which the first charging receptacle 30 is accessible. In this arrangement the charging jack is inserted through the first charging opening 20, the first housing charging opening 40 and the into the first charging receptacle 30.

Figure 4:
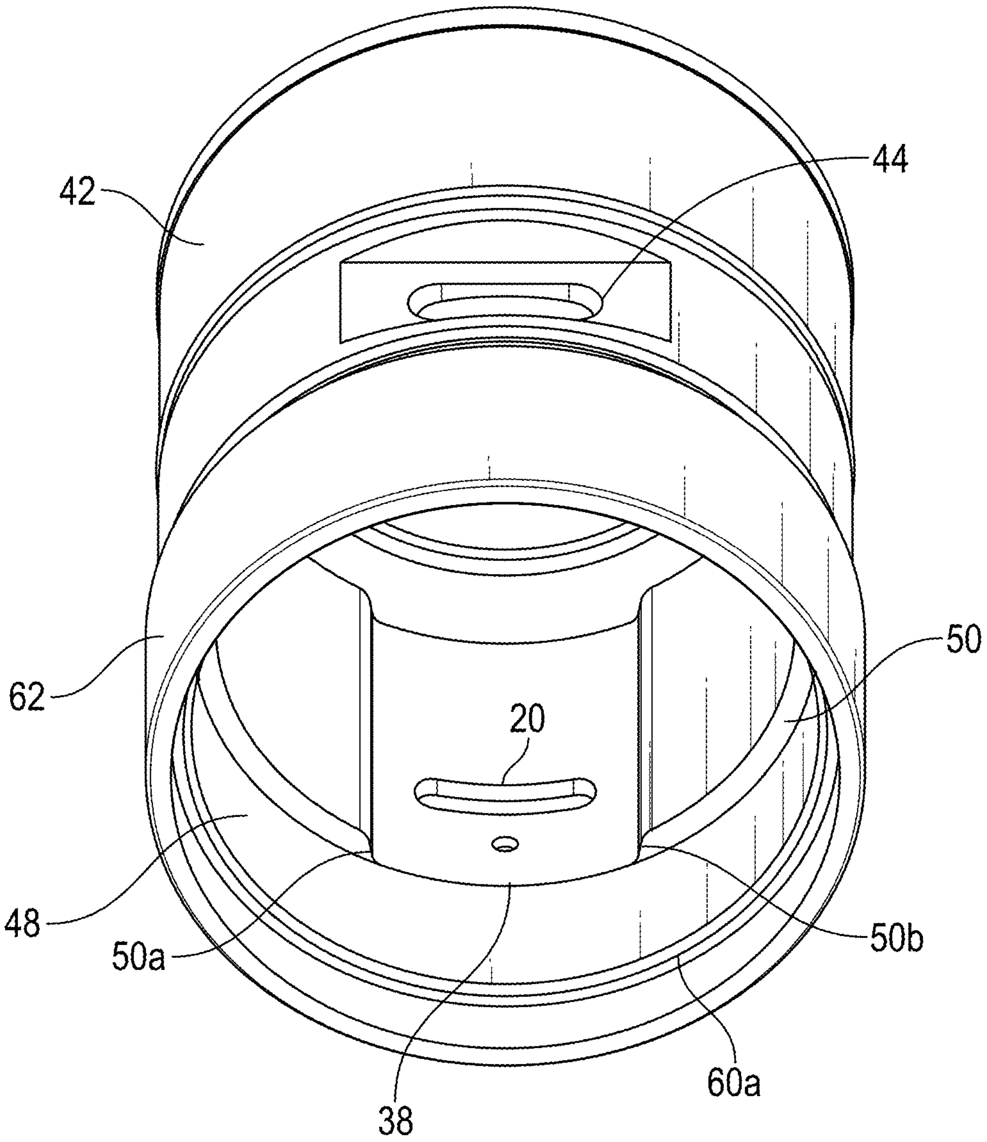
FIG. 4 is a perspective view of the tail portion.

As shown in FIG. 4, the tail portion 16 may include a second charging opening 44 that is associated with a second charging receptacle 46 (FIG. 2) in the battery assembly 22. The second charging receptacle may be located anywhere on the battery housing 24. In a preferred embodiment, the second charging receptacle 46 and second charging opening 44 and a second housing charging opening 47 are located about 180 degrees or opposite the first charging receptacle 30 and first charging opening 20. The second charging receptacle may be used for charging the battery cell and/or to pull power from the battery cell 28 to charge other devices. The battery assembly 22 and/or the tubular main body portion or tail portion may include an indicator (e.g., an LED indicator) located near the second charging receptacle or second charging opening (or the first) that shows the battery level. For example, the indicator may go from green to yellow to orange to red or like in 25% level increments as battery power is pulled (drained) to charge other devices.

Figure 2:
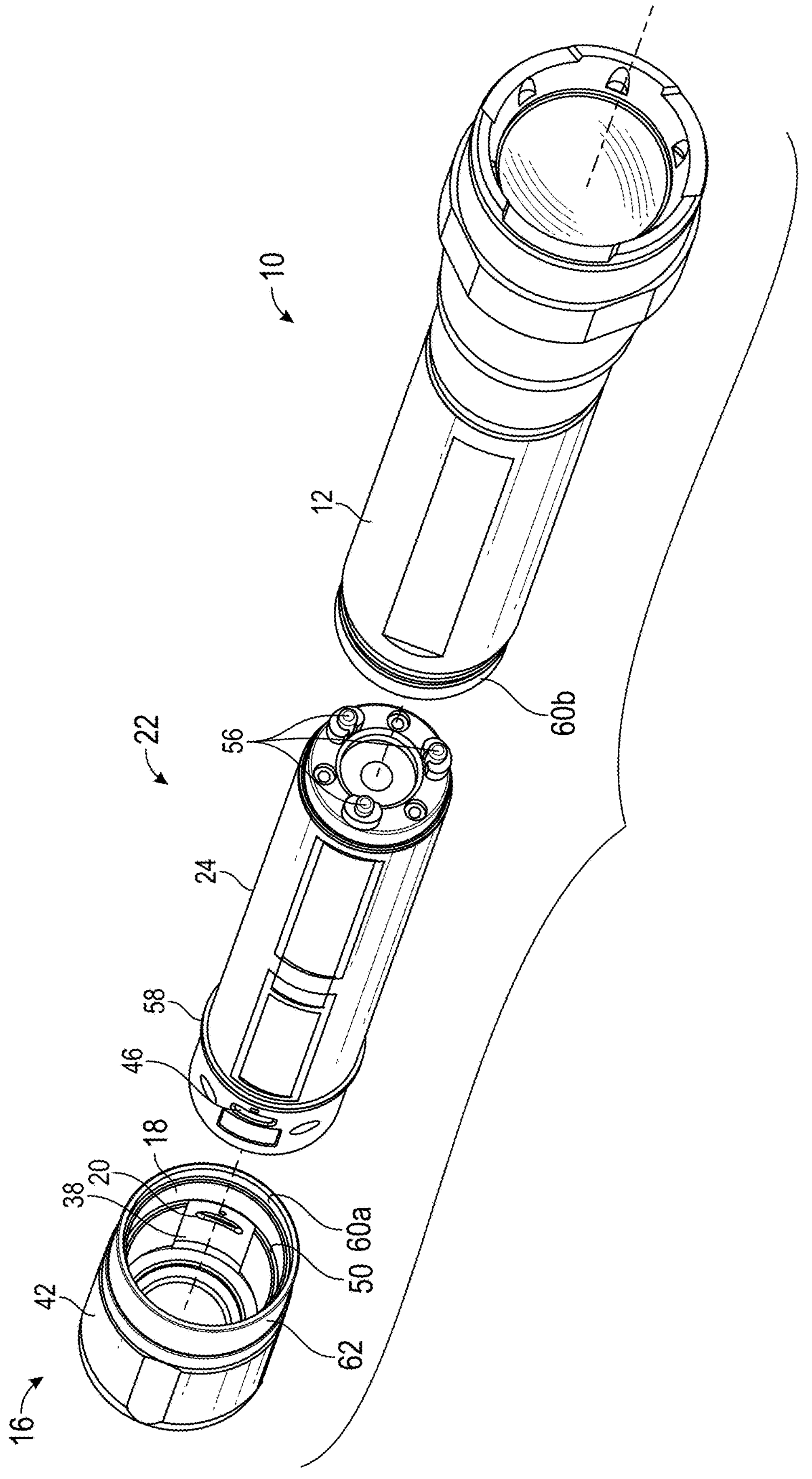
FIG. 2 is an exploded perspective view of the flashlight assembly of FIG. 1.
Figure 3:
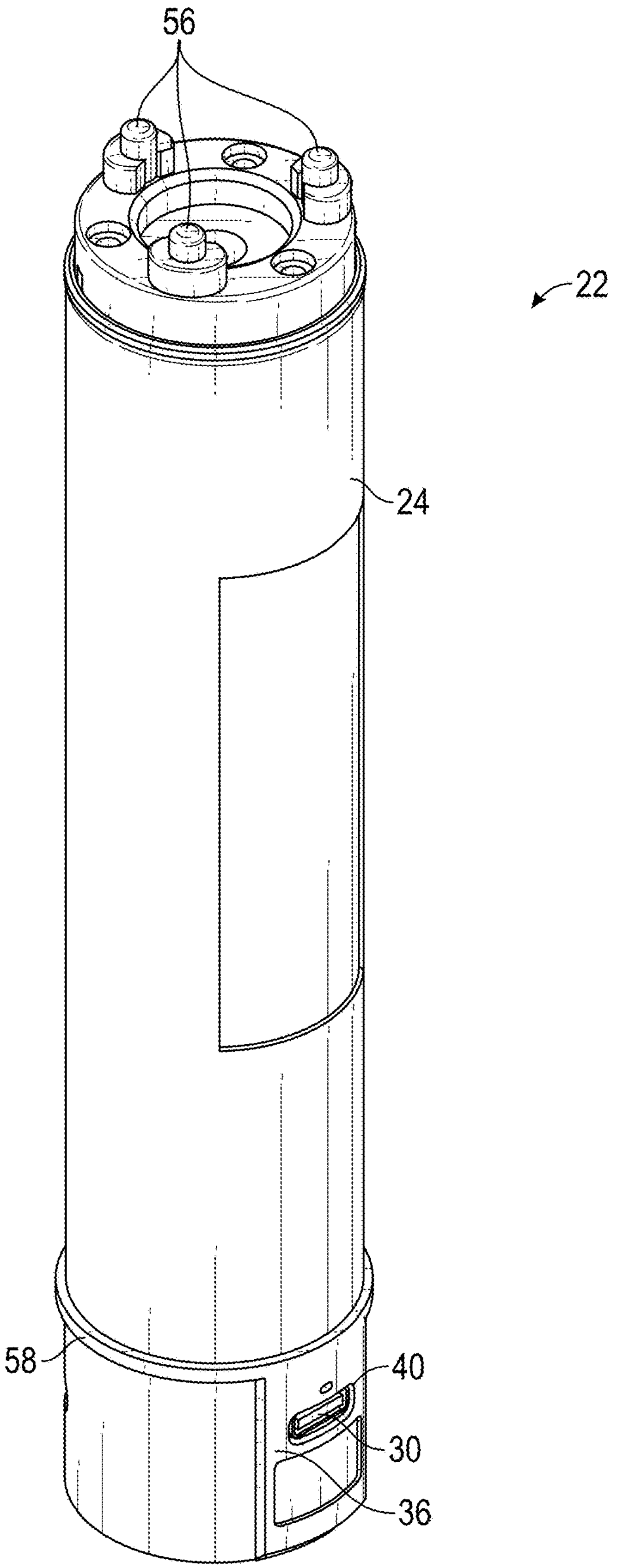
FIG. 3 is a perspective view of the rechargeable battery assembly.

The tail portion 16 may include a receptacle cover 42 that is movable between a first or closed position where the receptacle cover 42 covers the first charging opening 20 and the second charging opening 44 and a second or open position where the receptacle cover 42 does not cover the first charging opening 20 and the second charging opening 44. FIGS. 2 and 7A show the receptacle cover 42 in the first or closed position. FIGS. 4 and 7B show the receptacle cover 42 in the second or open position. In a preferred embodiment, the tubular main body portion 12 defines a flashlight axis and receptacle cover 42 is movable between the first and second positions along the flashlight axis A1. See the double ended arrow in FIG. 7B showing the axial direction in which the receptacle cover 42 can be moved. In another embodiment, the receptacle cover may be rotatable about the axis of the flashlight.

In a preferred embodiment, the first protrusion 36 is associated with the battery housing 24 and the first recess 38 is associated with the battery assembly interior 18 in the tail portion 16. The tail portion 16 includes an inner diameter 48 that at least partially defines the battery assembly interior 18. As is best shown in FIG. 4, an alignment flange 50 or alignment surface having first and second ends 50*a* and 50*b* extends around at least a portion of the inner diameter 48. The first recess 38 is defined between the first and second ends of the alignment flange 50. To insert the battery assembly 22 into the battery assembly interior 18 of the tail portion 16, the first protrusion 36 has to be aligned with and then inserted into the first recess 38. The tail portion 16 can then be connected to the tubular main body portion 12, preferably by threading the tail portion 16 onto the tubular main body portion 12. See first set of threads 60*a* and second set of threads 60*b* in FIG. 2. However, other connection methods are within the scope of the present invention. In a preferred embodiment, the first and/or second charging openings 20, 44 are shaped to align with or surround the first charging receptacle 30.

FIGS. 7A and 7B show the flashlight without the rechargeable battery assembly therein. The tail portion 16 may include a housing portion 62 on which the receptacle cover 42 is mounted and movable. The housing portion 62 may include a stop surface 64, as shown in FIG. 7B that abuts the forward surface of the receptacle cover 42, when the receptacle cover 42 is closed or moved to the first position. O-rings or the like may be included in strategic locations to prevent water from entering the battery assembly interior 18. For example, O-rings may be located axially fore and aft of the charging receptacles.

Preferably, the receptacle cover 42 is movable in a spiral path (e.g., due to internal threads or a protrusion and recess relationship between the receptacle cover 42 and the housing portion 62) as it moves between the first and second positions. As shown in FIG. 8, the battery assembly 22 may include a first PCB 52 on which the first and second charging receptacles 30 and 46 are mounted, a second PCB 54 associated with the one or more electrical contacts 56 for providing power from the battery assembly 22 to the light source 14 and electrical wiring for communicating power between different components in the battery assembly 22. Note that no wires electrically connecting and communicating the various in the battery assembly are not shown in FIG. 8. Any arrangement of components in the battery assembly 22 that provides the capability of recharging, powering the light source and other electrical components is within the scope of the present invention.

In a preferred embodiment, the battery assembly 22 includes a stop member 58 extending at least partially around the outer diameter or surface of the battery housing 24. When the battery assembly 22 is inserted into the battery assembly interior 18 with the first projection and recess properly aligned, the stop member 58 may abut against and is be stopped by the alignment flange 50.

In the drawings, the battery assembly is a rechargeable battery assembly. However, in another embodiment, the battery assembly may be a battery holder or cartridge that is configured to receive standard non-rechargeable batteries, such as AA batteries. This type of battery assembly may also include a first recess or a first protrusion that is part of the alignment system. The rechargeable battery assembly may be interchangeable with the non-rechargeable battery assembly.

The switch can be located anywhere on the flashlight assembly. FIG. 1 shows the switch located on the side of the tubular main body portion. The switch may also be located on the side or bottom/end of the tail portion.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A flashlight assembly comprising:

a main body portion that defines a main body portion battery assembly interior and that includes a light source associated therewith, a tail portion that defines a tail battery assembly interior and that is removable from the main body portion, wherein the main body portion battery assembly interior and tail battery assembly interior cooperate to define a battery assembly interior, wherein the tail portion includes a first charging opening defined therein that communicates the battery assembly interior with an exterior of the tail portion, a battery assembly positioned in the battery assembly interior, wherein the battery assembly includes a battery housing and at least a first charging receptacle associated with the battery housing, wherein the battery assembly is in electrical communication with the light source, a switch that is configured to selectively provide power to the light source, and wherein the flashlight assembly includes an alignment system associated with the tail portion, such that when the battery assembly is received in the tail battery assembly interior the first charging receptacle is aligned with the first charging opening, and a charging jack can be inserted through the first charging opening and into the first charging receptacle.

2. The flashlight assembly of claim 1 wherein the alignment system includes a first protrusion associated with the battery housing and a first recess associated with the battery assembly interior, wherein the tail portion includes an alignment surface having first and second ends, wherein the first recess is defined between the first and second ends of the alignment surface.

3. The flashlight assembly of claim 2 wherein when the battery assembly is received in the tail battery assembly interior, the first protrusion is received in the first recess and the first charging receptacle is aligned with the first charging opening.

4. The flashlight assembly of claim 2 wherein the battery housing includes a stop member, and wherein the stop member abuts the alignment surface.

5. The flashlight assembly of claim 1 wherein the tail portion includes a receptacle cover that is movable between a first position where the receptacle cover covers the first charging opening and a second position where the receptacle cover does not cover the first charging openings.

6. The flashlight assembly of claim 5 wherein the main body portion defines a flashlight axis, wherein the cover is movable between the first and second positions along the flashlight axis.

7. The flashlight assembly of claim 1 wherein the tail portion includes a second charging opening defined therein that communicates the battery assembly interior with the exterior of the tail portion, wherein the battery assembly includes a second charging receptacle, wherein when the battery assembly is received in the tail battery assembly interior the second charging receptacle is aligned with the second charging opening, such that a charging jack can be inserted through the second charging opening and into the second charging receptacle.

8. The flashlight assembly of claim 1 wherein the first charging opening is defined in a sidewall of the main body portion.

9. The flashlight assembly of claim 1 wherein the alignment system includes a first flat alignment surface associated with the battery housing and a second flat alignment surface associated with the tail battery assembly interior, wherein the first flat alignment surface is opposed to the second flat alignment surface when the first charging receptacle is aligned with the first charging opening.

10. The flashlight assembly of claim 9 wherein the tail portion includes an alignment flange and the battery housing includes a stop member, and wherein the stop member abuts the alignment flange.

11. The flashlight assembly of claim 1 wherein the alignment system includes a first flat alignment surface associated with the battery housing and a second flat alignment surface associated with the tail battery assembly interior, wherein when the battery assembly is received in the tail battery assembly interior and the first flat alignment surface is opposed to the second flat alignment surface, the first charging receptacle is aligned with the first charging opening.

12. The flashlight assembly of claim 1 wherein the alignment system includes one of a first protrusion or a first recess associated with the battery housing and the other of the first protrusion or the first recess associated with the battery assembly interior, wherein the first protrusion is received in the first recess and the first charging receptacle is aligned with the first charging opening.

13. A method of powering a flashlight assembly, the method comprising the steps of:

(a) obtaining the flashlight assembly, wherein the flashlight assembly includes a battery assembly with a first charging receptacle, a main body portion that defines a main body portion battery assembly interior, and a tail portion that defines a tail battery assembly interior, wherein the tail portion includes a first charging opening defined therein, wherein the flashlight assembly includes an alignment system associated with the battery assembly and the tail battery assembly interior, (b) inserting a portion of the battery assembly into the tail battery assembly interior, (c) placing the battery assembly into the main body portion battery assembly interior, and (d) securing the tail portion to the main body portion, wherein the battery assembly is electrically communicated with a light source in the main body portion and the first charging receptacle is aligned with the first charging opening.

14. The method of claim 13 wherein step (b) includes aligning a first flat alignment surface associated with the battery assembly and a second flat alignment surface associated with the tail battery assembly interior.

15. The method of claim 13 wherein step (d) includes rotating the tail portion and the battery assembly to threadingly engage a first set of threads on the tail portion with a second set of threads on the tubular main body portion.

16. The method of claim 13 wherein a spring is compressed during step (d).

17. The method of claim 13 wherein the tail portion includes a receptacle cover, and wherein the method includes the step of moving the receptacle cover from a first position where the receptacle cover covers the first charging opening to a second position where the receptacle cover does not cover the first charging opening.

18. The method of claim 13 further comprising aligning a first flat alignment surface associated with the battery assembly with a second flat alignment surface associated with the tail battery assembly interior prior to step (b).

19. The method of claim 13 wherein step (b) includes inserting a first protrusion associated with one of the battery assembly and the tail portion into a first recess associated with the other of the battery assembly and the tail portion.

* * * * *